US011831109B2

(12) United States Patent
Arduini et al.

(10) Patent No.: US 11,831,109 B2
(45) Date of Patent: Nov. 28, 2023

(54) ELECTRICAL CONNECTOR WITH INTEGRATED ELECTRONIC CONTROLLED POWER SWITCH OR CIRCUIT BREAKER SAFETY DEVICE

(71) Applicant: CISCO TECHNOLOGY, INC., San Jose, CA (US)

(72) Inventors: Douglas Paul Arduini, San Ramon, CA (US); Sung Kee Baek, San Ramon, CA (US); Joel Richard Goergen, Soulsbyville, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 163 days.

(21) Appl. No.: 17/122,165

(22) Filed: Dec. 15, 2020

(65) Prior Publication Data

US 2022/0190528 A1 Jun. 16, 2022

(51) Int. Cl.

| | |
|---|---|
| ***H02H 1/00*** | (2006.01) |
| ***H02H 1/04*** | (2006.01) |
| ***H02H 3/22*** | (2006.01) |
| ***H02H 9/06*** | (2006.01) |
| ***H01R 13/66*** | (2006.01) |
| ***H01R 13/713*** | (2006.01) |

(52) U.S. Cl.
CPC ..... *H01R 13/6666* (2013.01); *H01R 13/6683* (2013.01); *H01R 13/713* (2013.01)

(58) Field of Classification Search
CPC ............ H01R 13/6683; H01R 13/6666; H01R 13/713; H01R 13/7038; H01R 13/648
USPC .................................................. 361/115, 117
See application file for complete search history.

(56) References Cited

U.S. PATENT DOCUMENTS

| | | | |
|---|---|---|---|
| 7,566,987 | B2 | 7/2009 | Black et al. |
| 8,068,937 | B2 | 11/2011 | Eaves |
| 8,638,008 | B2 | 1/2014 | Baldwin et al. |

(Continued)

FOREIGN PATENT DOCUMENTS

| | | |
|---|---|---|
| CN | 105811290 A | 7/2016 |
| CN | 110190438 A | 8/2019 |

(Continued)

OTHER PUBLICATIONS

Sager Electronics, Anderson Power Products' SAF-D-GRID® 400, Aug. 28, 2020.

(Continued)

*Primary Examiner* — Jared Fureman
*Assistant Examiner* — Lucy M Thomas

(57) ABSTRACT

In one embodiment, and apparatus includes an electrical socket for connection with an electrical plug, a sensor for identifying a secure connection between the electrical socket and the electrical plug, and an electronic controller electrically coupled to the electrical socket and comprising a power input for receiving power. The electronic controller is operable to transmit power to the electrical socket upon receiving a signal from the sensor identifying the secure connection between the electrical socket and the electrical plug and shut off or turn on power to the electrical socket upon receiving an external input to the electronic controller. A method is also disclosed herein. The apparatus and method provide an electronic controlled power switch or circuit breaker safety device.

23 Claims, 10 Drawing Sheets

(56) References Cited

U.S. PATENT DOCUMENTS

| | | | | |
|---|---|---|---|---|
| 8,768,528 | B2 | 7/2014 | Millar et al. | |
| 8,781,637 | B2 | 7/2014 | Eaves | |
| 9,184,795 | B2 | 11/2015 | Eaves | |
| 9,419,436 | B2 | 8/2016 | Eaves et al. | |
| 9,853,689 | B2 | 12/2017 | Eaves | |
| 9,893,521 | B2 | 2/2018 | Eaves | |
| 10,263,526 | B2 | 4/2019 | Sandusky et al. | |
| 10,468,879 | B2 | 11/2019 | Eaves | |
| 10,541,543 | B2 | 1/2020 | Eaves | |
| 10,714,930 | B1 | 7/2020 | Weiss et al. | |
| 10,735,105 | B2 | 8/2020 | Goergen et al. | |
| 11,456,883 | B2 | 9/2022 | O'Brien et al. | |
| 2007/0149013 | A1* | 6/2007 | Eastham | H02J 13/0005 439/140 |
| 2009/0098754 | A1* | 4/2009 | Li | H01R 13/7038 439/93 |
| 2009/0284875 | A1* | 11/2009 | Ford | H01R 13/703 361/13 |
| 2009/0295225 | A1 | 12/2009 | Asplund | |
| 2011/0155545 | A1 | 6/2011 | Yang | |
| 2011/0304208 | A1* | 12/2011 | Lee | G06F 1/266 307/39 |
| 2012/0162862 | A1 | 6/2012 | Cosley | |
| 2016/0079718 | A1 | 3/2016 | Rohr | |
| 2016/0226198 | A1 | 8/2016 | Hsu | |
| 2016/0294500 | A1 | 10/2016 | Chawgo et al. | |
| 2016/0294568 | A1 | 10/2016 | Chawgo et al. | |
| 2017/0229886 | A1 | 8/2017 | Eaves | |
| 2018/0098201 | A1 | 4/2018 | Torello et al. | |
| 2018/0123360 | A1 | 5/2018 | Eaves | |
| 2018/0131165 | A1 | 5/2018 | Yang | |
| 2018/0212369 | A1* | 7/2018 | Bulmer | H01R 13/7036 |
| 2018/0313886 | A1 | 11/2018 | Mlyniec et al. | |
| 2019/0103742 | A1 | 4/2019 | Kennedy et al. | |
| 2019/0280895 | A1 | 9/2019 | Mather et al. | |
| 2019/0313546 | A1 | 10/2019 | Zhang | |
| 2022/0190587 | A1 | 6/2022 | Eaves et al. | |

FOREIGN PATENT DOCUMENTS

| | | | |
|---|---|---|---|
| DE | 2 144 339 | A1 * | 6/2009 |
| EP | 2144339 | A1 | 1/2010 |
| JP | 2017220348 | A | 12/2017 |
| WO | 2007/072581 | A1 | 6/2007 |

OTHER PUBLICATIONS

Communication Relating to the Results of the Partial International Search in counterpart International Application No. PCT/US2021/062544, dated Mar. 29, 2022, 11 pages.

International Search Report and Written Opinion in counterpart International Application No. PCT/US2021/062544, dated May 30, 2022, 23 pages.

Kiedaish, Jill, Popular Mechanics, https://www.popularmechanics.com/technology/infrastructure/a27557804/digital-circuit-breaker/, May 22, 2019.

Astronics.com, CorePower Power Solutions, Astronics Advanced Electronic Systems, Product Specification 180116, 2020.

https://new.abb.com/new/detail/18499/abb-reinvents-the-circuit-breaker-breakthrough-digital-technology-for-renewables-and-next-gen-power-grids, Hannover, Germany, Apr. 1, 2019.

Doughty, Rani et al., Lenovo Flex Systems Higher Voltage DC Solutions, Apr. 2015.

Anderson Power Products, Power Connector Solutions, Amperes, Safely Connect Power with Simplicity and Intelligence, LIT-PCS Rev 9, 2020-0096, 2020.

"Product Selection Guide," Starline Track Busway, 2017, 218 pages.

David E. Geary, "The Transition Path to dc," dc Fusion, LLC, 2015, 101 pages.

"IEC 60320," Wayback Machine, Wikipedia, https://web.archive.org/web/20201124225116/https://en.wikipedia.org/wiki/IEC_60320, Sep. 29, 2020, 12 pages.

"IEC 62368—1:2018," IECSTD, Version 3.4 2018, 380 pages.

"UL 60950—Safety of Information Technology Equipment," Underwriters Laboratories Inc. (UL), Third Edition, ISBN 0-7629-0470-4, Dec. 1, 2000, 436 pages.

*Voltserver Inc.*, v. *Cisco Technology, Inc.*, "Decision Denying Institution of Post-Grant Review," United States Patent and Trademark Office, PGR2021-00055, U.S. Pat. No. 10,735,105 B2, Aug. 19, 2021, 25 pages.

*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.

"Effects of current on human beings and livestok—Part 1: General aspects," Technical Specification, Basic Safety Publication, IEC/TS 60479-1, Edition 4.0, Jul. 2005, 122 pages.

"Information technology equipment—Safety—Part 1: General requirements," International Standard, IEC 60950-1, Edition 2.2, May 2013, pp. 1-61, 63 pages.

"Information technology equipment—Safety—Part 1: General requirements," International Standard, IEC 60950-1, Edition 2.2, May 2013, pp. 62-122, 61 pages.

"Information technology equipment—Safety—Part 1: General requirements," International Standard, IEC 60950-1, Edition 2.2, May 2013, pp. 123-181, 59 pages.

"Information technology equipment—Safety—Part 1: General requirements," International Standard, IEC 60950-1, Edition 2.2, May 2013, pp. 182-253, 72 pages.

"Information technology equipment—Safety—Part 1: General requirements," International Standard, IEC 60950-1, Edition 2.2, May 2013, pp. 254-319, 66 pages.

"Information technology equipment—Safety—Part 1: General requirements," International Standard, IEC 60950-1, Edition 2.2, May 2013, pp. 320-377, 58 pages.

"Information technology equipment—Safety—Part 1: General requirements," International Standard, IEC 60950-1, Edition 2.2, May 2013, pp. 378-433, 56 pages.

"Information technology equipment—Safety—Part 1: General requirements," International Standard, IEC 60950-1, Edition 2.2, May 2013, pp. 434-490, 57 pages.

"Information technology equipment—Safety—Part 1: General requirements," International Standard, IEC 60950-1, Edition 2.2, May 2013, pp. 491-551, 61 pages.

"Information technology equipment—Safety—Part 1: General requirements," International Standard, IEC 60950-1, Edition 2.2, May 2013, pp. 552-622, 71 pages.

"Information technology equipment—Safety—Part 1: General requirements," International Standard, IEC 60950-1, Edition 2.2, May 2013, pp. 623-644, 24 pages.

"Low-voltage switchgear and controlgear—Part 1: General rules," International Standard, Amendment 2, IEC 60947-1, Edition 5.0, Sep. 2014, pp. 1-63, 65 pages.

"Low-voltage switchgear and controlgear—Part 1: General rules," International Standard, Amendment 2, IEC 60947-1, Edition 5.0, Sep. 2014, pp. 64-102, 41 pages.

Stephen Edelstein, "Updated 2016 Tesla Model S also gets new 75-kWhbattery option," Internet Archive WayBack Machine, Green Car Reports, May 5, 2016, 3 pages.

Stephen S. Eaves, "Network Remote Powering using Packet Energy Transfer," IEEE Xplore, Proceedings of IEEE International Conference on Telecommunications Energy (INTELEC) 2012, 978-1-4673-1000, Sep. 30-Oct. 4, 2012, 4 pages.

"Audio/video, information and communication technology equipment—Part 1: Safety requirements," International Standard, IEC 62368-1, Edition 2.0, Feb. 2014, pp. 1-132, 134 pages.

"Audio/video, information and communication technology equipment—Part 1: Safety requirements," International Standard, IEC 62368-1, Edition 2.0, Feb. 2014, pp. 133-263, 131 pages.

"Audio/video, information and communication technology equipment—Part 1: Safety requirements," International Standard, IEC 62368-1, Edition 2.0, Feb. 2014, pp. 264-387, 124 pages.

(56) References Cited

OTHER PUBLICATIONS

"Audio/video, information and communication technology equipment—Part 1: Safety requirements," International Standard, IEC 62368-1, Edition 2.0, Feb. 2014, pp. 388-508, 121 pages.
"Audio/video, information and communication technology equipment—Part 1: Safety requirements," International Standard, IEC 62368-1, Edition 2.0, Feb. 2014, pp. 509-593, 85 pages.
"Audio/video, information and communication technology equipment—Part 1: Safety requirements," International Standard, IEC 62368-1, Edition 2.0, Feb. 2014, pp. 594-676, 85 pages.
"National Electrical Code," National Fire Protection Association (NFPA) 70, 2017, 881 pages.
*Voltserver Inc*., v. *Cisco Technology, Inc*., "Declaration of David A. Durfee, Ph.D.," United States Patent and Trademark Office, PGR2021-00055, U.S. Pat. No. 10,735,105, Feb. 16, 2021, 340 pages.
David A. Durfee Ph.D., "Curriculum Vitae," 4 pages.
Adel S. Sedra, "Microelectronic Circuits," Sedra/Smith, Oxford University Press, Seventh Edition, 2015, 38 pages.
Charles k. Alexander, et al., "Fundamentals of Electric Circuits," McGraw Hill Education, Indian Edition 5e, 2013, 37 pages.
Andrew S. Tanenbaum, "Computer Networks," Prentice Hall PTR, Third Edition, 1996, 12 pages.
William Stallings, "Data and Computer Communications," Macmillan Publishing Company, Fourth Edition, 1994, 14 pages.
B.P. Lathi, et al., "Modern Digital and Analog Communication Systems," Oxford University Press, Fourth Edition, 2009, 15 pages.
*Voltserver Inc*., v. *Cisco Technology, Inc*., "Petition for Post Grant Review of U.S. Pat. No. 10,735,105," United States Patent and Trademark Office, PGR2021-00055, U.S. Pat. No. 10,735,105, Feb. 16, 2021, 132 pages.
Stephen H. Hall, et al., "High-Speed Digital System Design: A handbook of Interconnect Theory and Design Practices,", John Wiley & Sons, Inc., 2000, 55 pages.
"Understanding 802.3at, PoE Plus Standard Increases Available Power," Microsemi, Jun. 2011, 7 pages.
"Digital Electricity Gen2 Detailed Installation Manual," Voltserver Digital Electricity, Rev B.1, Nov. 29, 2017, 68 pages.
Berkeley Lab ETA, "Touch-Safe, High Voltage Digital Electricity Transmission using Packet Energy Transfer," Vimeo, https://vimeo.com/172469008, Mar. 8, 2016, 8 pages.
*Voltserver Inc*., v. *Cisco Technology, Inc*., "Decision Denying Institution of Post-Grant Review," United States Patent and Trademark Office, PGR2021-00056, U.S. Pat. No. 10,735,105 B2, Aug. 23, 2021, 18 pages.
*Voltserver Inc*., v. *Cisco Systems, Inc*., "Patent Owner's Preliminary Response to Post Grant Review Under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.
*Voltserver Inc*., v. *Cisco Technology, Inc*., "Declaration of Stephens S. Eaves," United States Patent and Trademark Office, PGR2021-00056, U.S. Pat. No. 10,735,105, Feb. 16, 2021, 7 pages.
"Electrical—Computer Conference Proceedings," Internet Archive WayBack Machine Search for Intelec 2012, Curran Associates, Inc., http://www.proceedings.com/electrical-computer-proceedings.html, 2012, 125 pages.
"Part VII: A Summary of Commonly Used MARC 21 Fields," Marc, Understanding MARC, https://www.loc.gov/marc//umb/um07to10.html, retrieved from Internet Feb. 13, 2021, 17 pages.
LC Catalog-Browse, https://catalog.loc.gov/vwebv/searchBrowse, retrieved from the Internet Feb. 12, 2021, 1 page.
"International Telecommunications Energy Conference: [proceedings] (Marc Tags)," Library Catalog, https://catalog.loc.gov/vwebv/staffView?searchId=3877&recPointer=0&recCount=25&searchType=1&bibId=11348322, retrieved from the Internet Feb. 12, 2021, 3 pages.
*Voltserver Inc*., v. *Cisco Technology, Inc*., "Petition for Post Grant Review of U.S. Pat. No. 10,735,105," United States Patent and Trademark Office, PGR2021-00056, U.S. Pat. No. 10,735,105, Feb. 16, 2021, 116 pages.
"International Telecommunications Energy Conference: [proceedings] (Full Record)," Library Catalog, https://catalog.loc.gov/vwebv/holdingsInfo?searchId=3810&recPointer=0&recCount=25&searchType=1&bibId=11348322, retrieved from the Internet Feb. 12, 2021, 4 pages.

* cited by examiner

ELECTRICAL CONNECTOR WITH INTEGRATED ELECTRONIC CONTROLLED POWER SWITCH OR CIRCUIT BREAKER SAFETY DEVICE

TECHNICAL FIELD

The present disclosure relates generally to electrical connectors, and more particularly, to an electrical connector with an integrated electronic controlled power switch or circuit breaker safety device.

BACKGROUND

There is a need for high voltage (e.g., >60V) AC (alternating current) or DC (direct current) connector socket with safety shock protection when exposed or when not plugged in securely and safely. Also, the use of HVDC (e.g., 240-380 VDC) in telecommunications equipment is rapidly developing along with next generation DC systems. HVDC provides many benefits, including higher efficiency and lower operating expenses, but also introduces implementation difficulties. One problem that needs to be overcome is related to HVDC connections, which are fundamentally hazardous.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
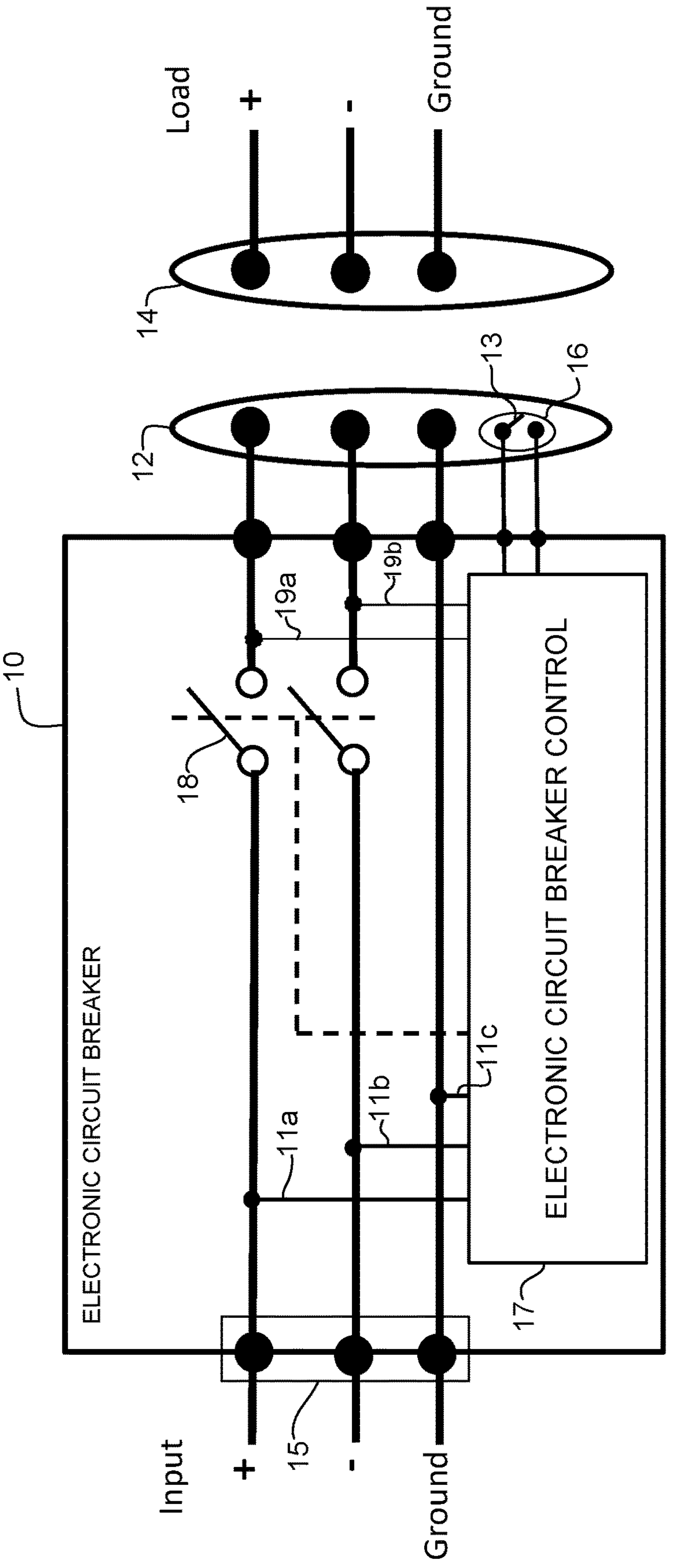
FIG. 1 is a block diagram of an electronic circuit breaker and electrical connector, in accordance with one embodiment.

In one embodiment, an apparatus generally comprises an electrical socket for connection with an electrical plug, a sensor for identifying a secure connection between the electrical socket and the electrical plug, and an electronic controller electrically coupled to the electrical socket and comprising a power input for receiving power. The electronic controller is operable to transmit power to the electrical socket upon receiving a signal from the sensor identifying the secure connection between the electrical socket and the electrical plug and shut off power to the electrical socket upon receiving an external input to the electronic controller.

In another embodiment, an apparatus generally comprises an electronic circuit breaker comprising a power input for receiving power, an integrated electrical socket for transmitting the power to a connected electrical plug, and a sensor for identifying a secure connection of the electrical socket to the electrical plug. The power is transmitted to the electrical plug upon the sensor identifying the secure connection between the electrical socket and the electrical plug.

In yet another embodiment, a method generally comprises receiving an electrical plug at an electrical socket integrated with an electronic controller, receiving a signal from a sensor identifying a secure connection of the electrical plug to the electrical socket at the electronic controller, enabling power transmittal from the electrical socket to the electrical plug, receiving a control signal at the electronic controller to shut off power; and disabling power transmittal from the electrical socket to the electrical plug.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

High voltage direct current (HVDC) (e.g., 380 VDC) provides many benefits but there are still a number of drawbacks with regards to available connectors. IEC (International Electrotechnical Commission) defines a set of standards specifying power connectors, which include connector types such as IEC 60320 C13/C14 or C19/C20, which are commonly used with telecommunications equipment. However, standard IEC connectors cannot be used with HVDC since they are limited to 250 VAC (volts alternating current). Currently available HVDC connectors are single sourced, expensive, and have a limited life span since they utilize a sacrificial contact area with a very low plug cycle count.

Challenges with HVDC connectors include increased difficulty with DC current interruption, and arc-flash risks on connect and disconnect. Connecting or disconnecting under load may lead to electrical arcing between contacts of a live electrical connector, present a safety hazard to a user, and reduce the useful life of the connector, thereby reducing component life span and reliability, and increasing operating expenses and safety concerns. Moreover, there are also safety concerns with DC or AC (alternating current) connectors when the connector is disconnected and power is live at the socket.

There is also a need for an electronic controlled power switch or circuit breaker that can be located locally and integrated with the connector to provide additional safety features such as local control, safety lockout, safety interlock, emergency power off protection, visual indication, or monitoring of input and output power.

The embodiments described herein provide a smart electronic controller (electronic controlled power switch or circuit breaker) that may be integrated with a safe power connector. In one or more embodiments, the electronic controller may be locally or remotely controlled for power on/off, reset, lockout operation and may also operate as a digital circuit breaker for AC or DC power control. As can be observed from the following description, the electronic controller and integrated socket are configured for long-life, high-reliability, fail-safe redundancy, touch-safe, mated safe operation, and reduced cost. As described below, the integrated socket provides a safe device since voltage is not transmitted unless the connection between the socket and plug is secure and fully mated.

The embodiments described herein may be implemented in a data center, renewable power system, regenerative energy system, micro-grid power network, or any other network system. For example, the electronic controller and integrated socket may be used in a power distribution system to power higher power router or switch platforms and eliminate power cords to each power supply unit. In one or more embodiments, the electronic controller and integrated power socket may be configured to transmit HVDC (e.g., 380 VDC), AC (e.g., 208 VAC), ESP (Extended Safe Power), or any other voltage level power.

In one or more embodiments, the connector may be configured for single-phase or multi-phase pulse power, also referred to as ESP or FMP (Fault Managed Power). ESP as used herein refers to high power (e.g., >100 W), high voltage (e.g., >56V) operation with pulse power delivered on one or more wires or wire pairs. In one or more embodiments, ESP includes fault detection (e.g., fault detection at initialization and between high voltage pulses) and pulse synchronization between power sourcing equipment (PSE) and a powered device (PD). The power may be transmitted with communications (e.g., bi-directional communications) or without communications. The term "pulse power" (also referred to as "pulsed power") as used herein refers to power that is delivered in a sequence of pulses (alternating low direct current voltage state and high direct current voltage state) in which the voltage varies between a very small voltage (e.g., close to 0V, 3V) during a pulse-off interval and a larger voltage (e.g., >12V, >24V) during a pulse-on interval. High voltage pulse power (HVDC pulse power) may be transmitted from power sourcing equipment to a powered device for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety. ESP may be used to provide high voltage DC touch-safe line-to-line shock protection, for example. It is to be understood that the power and voltage levels described herein are only examples and other levels may be used.

ESP may comprise pulse power transmitted in multiple phases in a multi-phase pulse power system with pulses offset from one another between wires or wire pairs to provide continuous power, as described in U.S. patent application Ser. No. 16/380,954 ("Multiple Phase Pulse Power in a Network Communications System"), filed Apr. 10, 2019, which is incorporated herein by reference in its entirety.

Referring now to the drawings, and first to FIG. 1, an apparatus comprising an electronic controller (electronic switch or circuit breaker) 10 with integrated electrical socket 12 for connection with an electrical plug 14 is shown, in accordance with one embodiment. The socket 12 comprises a sensor 16 for identifying a secure connection between the socket and plug 14. The electronic circuit breaker 10 comprises a power input 15 (e.g., +wire, −wire, optional ground) for receiving power. The input interface 15 may comprise, for example, an HVDC connection with 380 VDC mid-point grounded +190 VDC line, a −190 VDC line, and an optional source ground, or any other type of input line (DC, AC, ESP, or other voltage level DC). The plug 14 may be connected (e.g., integral with) a cable coupled to a +190 VDC load, −190 VDC load, and optional load ground, for example. The plug 14 may also be directly coupled with (or integral with) a network device. Power is transmitted to the plug 14 upon the sensor 16 identifying a secure connection between the electrical socket 12 and the electrical plug 14. The plug 14 comprises pin contacts (male portion) (positive (line) contact, negative (neutral) contact, and ground contact (optional)) and the socket 12 comprises socket contacts (female portion) for receiving the respective pin contacts. In one or more embodiments, the external mating connection (pin contacts, socket contacts) corresponds to a standard connector (e.g., IEC 60320 C13/C14 or C19/C20), however, other configurations corresponding to current or future standards, or formats unrelated to a standard may also be used. The connector (socket 12, plug 14) may also be configured to receive AC power (e.g., 3-phase AC Delta or Wye) or single-phase or multi-phase pulse power.

The electronic circuit breaker 10 is operable to transmit power to the socket 12 upon receiving a signal from the sensor 16 identifying the secure connection between the socket and plug 14. In one or more embodiments, the electronic circuit breaker 10 is operable to shut off power or turn on power to the socket upon receiving an external input (e.g., local manual input or electrical signal, control signal, or analog or digital signal received from remote source), as described below with respect to FIG. 2. The electronic circuit breaker 10 includes a control unit (logic, software, firmware, module, device, controller) 17 operable to receive input from the sensor 16 and enable power through electronic control of a switch (e.g., FET (Field-Effect Transistor)), electromechanical switch (e.g., relay) or other electronically controlled device. In the example shown in FIG. 1, the sensor 16 comprises a microswitch 13 that is activated by the plug body or contacts (e.g., twist and latch mechanism) or any other suitable electrical, mechanical, magnetic, optical, or electromechanical device as described below with respect to FIGS. 4A-4C.

As shown in FIG. 1, the controller 17 electronically controls a switch 18 operable to connect positive and negative (neutral) wires coupled to the input 15 to the socket 12. Since the power is not enabled at the switch 18 until the sensor 16 provides feedback that the socket 12 and plug 14 have been properly connected, the socket 12 provides a safe-touch connector with power lockout (power-on inhibit) for safe high voltage DC or AC operation. Furthermore, since the power is disconnected before internal connections are made or broken between the socket 12 and plug 14, safety protection from touching the plug contracts and from arc-flash is provided with power disconnect before mating or unmating the connector (make/break of power contacts between socket 12 and plug 14). Protection is provided from connector power pins/blades arcing or burning during mating or unmating of connector or from a loose connection that is not properly latched. In one or more embodiments, the electronic circuit breaker 10 provides soft-start in-rush current control and self-protect semiconductor elements.

The electronic circuit breaker 10 includes circuit breaker components (e.g., digital circuit breaker circuit for DC or AC power), which are controlled by feedback from the load. As shown in FIG. 1, the controller 17 may provide input voltage sense at connections 11*a*, 11*b*. Connections 19*a*, 19*b* may provide output current sense, arc-fault sense, and output voltage sense. The electronic circuit breaker 10 may provide, for example, overcurrent and overvoltage protection (shut-off). The switch 18 (or another switch) is automatically closed for a period of time if the current drawn by the load (e.g., sensed by a resistor) results in too much current flowing in the line, and may then be turned on after that period of time. The electronic circuit breaker 10 may be configured, for example, with an auto-reset or auto-turn on option with a limited number of tries. The electronic circuit breaker 10 may comprise a current sensing and relay circuit configured to sense current and shutoff power to provide overload and short circuit protection. For example, a voltage drop may generate an output that drives a relay through a MOSFET (Metal-Oxide-Semiconductor Field-Effect Transistor) (or any other suitable switching element) to trip the load instantaneously. The electronic circuit breaker 10 may provide overload and short circuit protection and may trip the switch on sensing overcurrent or any other fault. In one or more embodiments, the electronic circuit breaker 10 may provide overcurrent protection with an adjustable circuit breaker trip level current/time curve. In one or more embodiments, the electronic circuit breaker 10 may be configured for high-voltage DC or AC ground fault shock protection, GFI (Ground Fault Interrupter), GFP (Ground Fault Protection), midpoint high resistance grounding for high voltage DC power, line-to-ground shock protection shut-off, line-to-line shock protection shut-off (e.g., with ESP), arc-fault protection shut-off, or any combination thereof.

Figure 2:
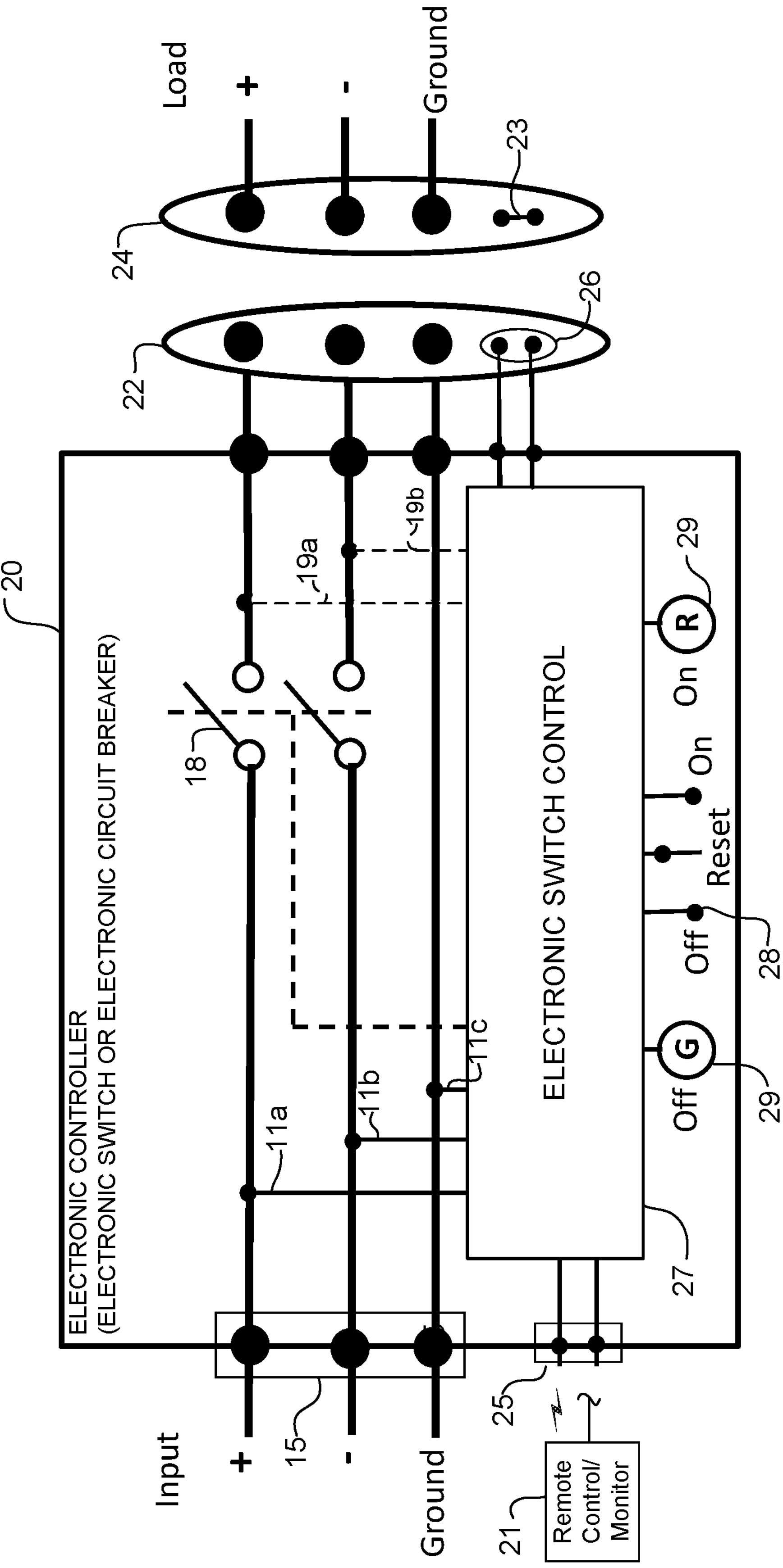
FIG. 2 is a block diagram of an electronic controller with local and remote control of a power switch or circuit breaker, in accordance with one embodiment.

FIG. 2 illustrates another example of an electronic controller 20 (electronic switch, electronic circuit breaker) with integrated socket 22 for connecting to a plug 24. In one or more embodiments, an apparatus comprises the electrical socket 22 for connection with the electrical plug 24 and the electronic controller electrically coupled to the electrical socket and comprising the power input 15 for receiving power and a sensor 26 for identifying a secure connection between the socket and plug. The electronic controller 20 is operable to transmit power to the electrical socket 22 upon receiving a signal from the sensor 26 identifying the secure connection between the electrical socket and the electrical plug and shut off power to the socket upon receiving an external input to the electronic controller at remote control interface 25.

The electronic controller 20 comprises a control unit 27 operable to turn on or off power to the socket at switch 18, as previously described with respect to FIG. 1. In this example, the plug 24 comprises an electrical interlock 23 for communication with the sensor 26. When the plug 14 is inserted into the socket 12, the interlock 23 contacts sensor 26 to indicate that the socket 22 and plug 24 are properly connected. As previously noted, the sensor may comprise any suitable electrical, mechanical, magnetic, optical, or electromechanical interface as described below with respect to FIGS. 4A-4C. The electronic controller 20 may also operate as an electronic circuit breaker with circuit breaker components, as described above.

In the example shown in FIG. 2, the electronic controller 20 comprises the interface 25 for receiving remote input (analog wire, digital signal, wireless signal) from a remote source (remote location) 21 for remote on/off control (external safety interlock) or monitoring. The electronic controller 20 is operable to disconnect power upon receiving a signal from the remote source 21. The remote source 21 may be used to provide high voltage safety emergency power off (EPO) with remote switch interlock to one or more electronic controllers. For example, the remote source 21 may turn off a group of electronic controllers associated with a control function or location. The same interface 25 (or a different interface) may also be used for remote monitoring. In one example remote digital smart control and monitoring may be provided through interface 25, which may comprise a wired or wireless interface. The electronic controller 20 may be configured to transmit power monitoring information to the remote device 21 (controller, management device). For example, the electronic controller 20 may be configured for input power voltage/current monitoring (11*a*, 11*b*, 11*c*), output power voltage/current monitoring (19*a*, 19*b*), or any combination thereof. Remote monitoring may include monitoring of input/output voltage/current and operating status, for example.

As shown in the example of FIG. 2, the electronic controller 20 may also receive local input at manual switch 28 (e.g., on/off/reset button (or buttons)). LEDs (Light Emitting Diodes) 29 or other indicators may also be provided to indicate a power status (e.g., power off (green (G)), power on (red (R)). It is to be understood that the local input and output shown in FIG. 2 is only an example and any number of indicators (e.g., one or more) or manual input devices may be provided to allow for direct user input to the control unit 27.

It is to be understood that the electronic controllers (circuit breaker, switch) shown in FIGS. 1 and 2 are only examples and changes may be made with departing from the scope of the embodiments, For example, the system may include any combination of electronic circuit breaker or electronic switch capabilities, remote monitoring, local monitoring (overcurrent or overvoltage protection), arc-fault protection, remote control, local control, interlock, or other functions described herein. In one or more embodiments, the socket is integrally formed with the electronic controller (e.g., share housing or permanently coupled). In one or more embodiments, the socket is electrically coupled with the electronic controller (e.g., cable, wires connecting electronic controller and socket). In one or more embodiments, the electronic controller and socket are configured for safe high-voltage AC or DC (e.g., 380 VDC) operation. As described below, the electronic controller (circuit breaker, switch) may include one or more solid state switch devices, including, but not limited to, MOSFET (Metal-Oxide-Semiconductor Field-Effect Transistor), IGBT (Insulated-Gate Bipolar Transistor), GaN (Gallium Nitride) transistor, SiG (silicon carbide) transistor, SCR (Silicon Controlled Rectifier), TRIAC (Triode for Alternating Current), GTO (Gate Turn Off thyristor), SSR (Solid State Relay), and the like.

Figure 3A:
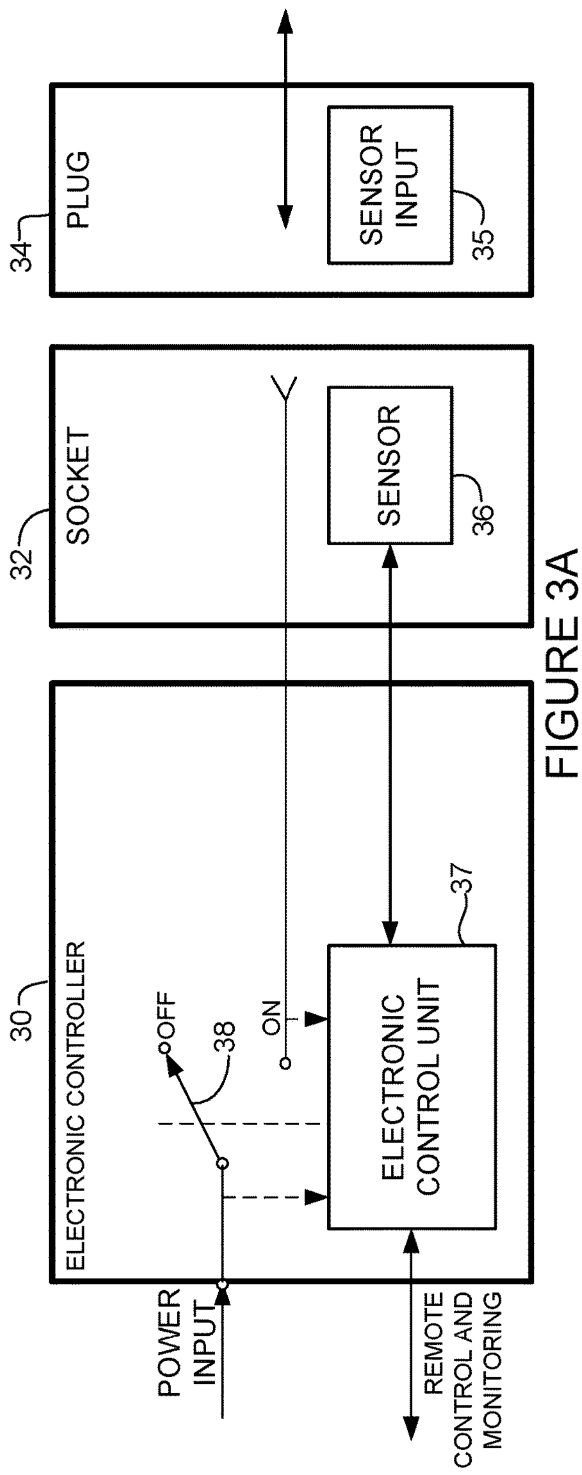
FIG. 3A is a block diagram of the electronic controller and a socket and plug of the electrical connector in a disconnected state.
Figure 3B:
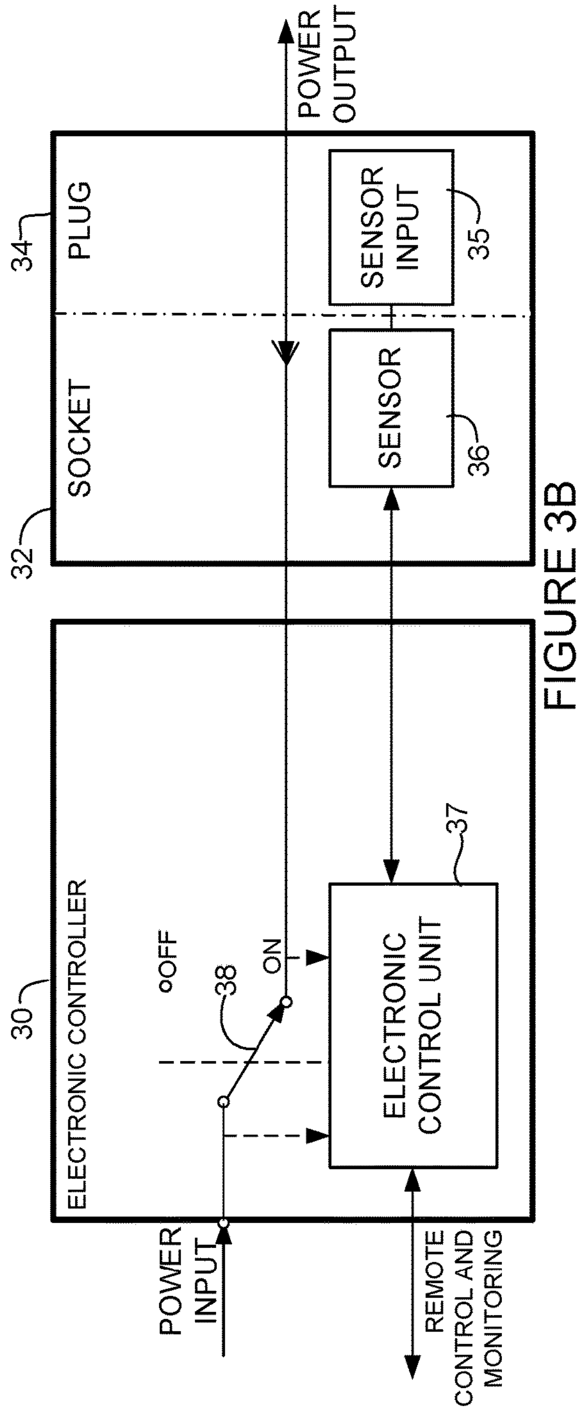
FIG. 3B is a block diagram of the electronic controller and the socket and plug in a connected, fully mated state.

FIG. 3A is a block diagram of an electronic controller (electronic circuit breaker, electronic switch) 30, socket 32, and plug 34 with the socket and plug disconnected. As previously described, the electronic controller 30 comprises a power input and a switch 38 electronically controlled by control unit 37. The plug 34 is configured to provide sensor input 35 (described below with respect to FIGS. 4A-4C) to sensor 36. FIG. 3A shows the plug 34 disconnected from the socket 32, thus the switch 38 is in its OFF position (disconnected state, power disabled). When a secure connection is made between the plug 34 and socket 32, as shown in FIG. 3B, the sensor 36 sends a signal to the electronic control unit 37, which in turn sends a signal to the switch 38 to move to its ON position (connected state, power enabled). The power is then output at the plug 34 (e.g., connected cable or network device).

Figure 4A:
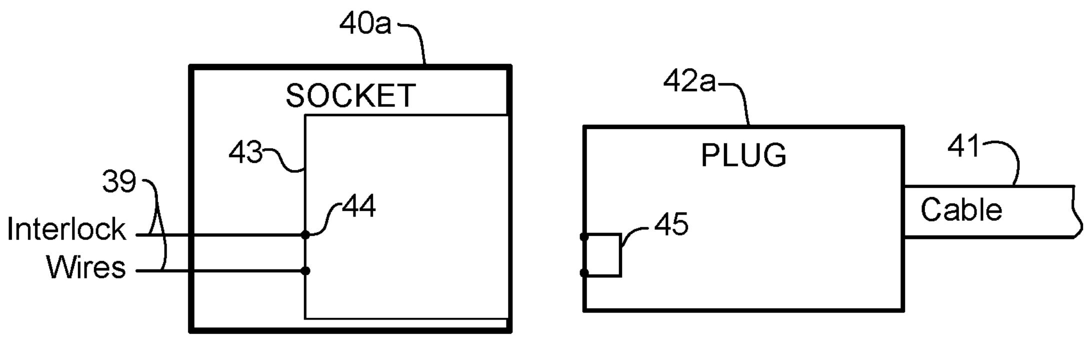
FIG. 4A is a schematic of the socket and plug with an electrical switch sensor, in accordance with one embodiment.
Figure 4B:
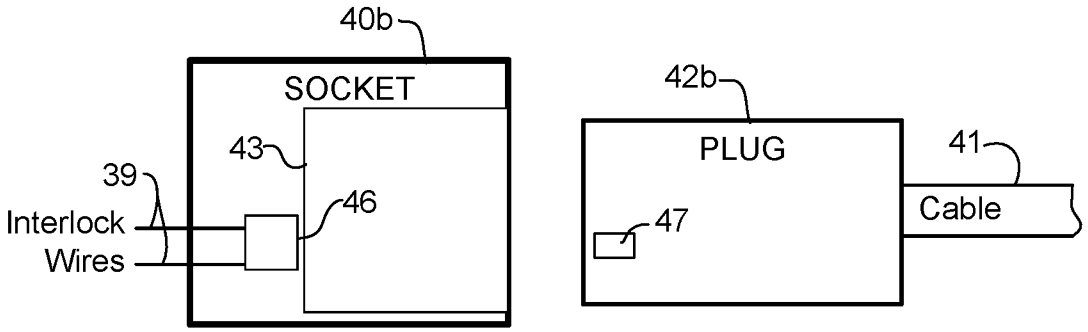
FIG. 4B is a schematic of the socket and plug with a proximity switch sensor, in accordance with one embodiment.
Figure 4C:
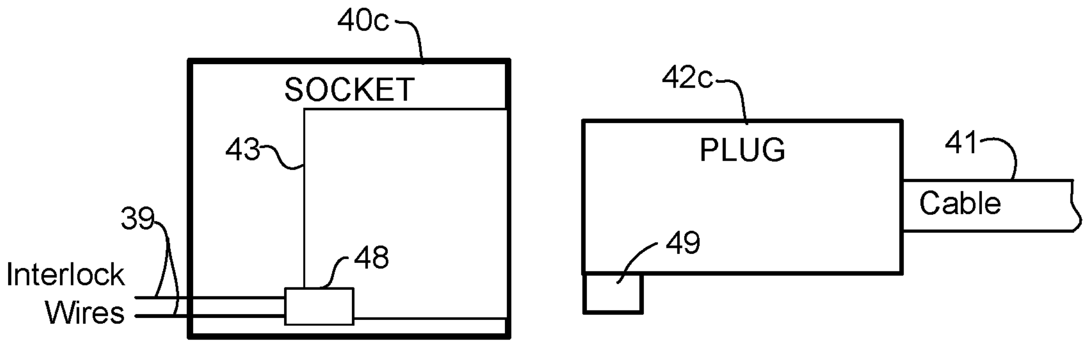
FIG. 4C is a schematic of the socket and plug with a mechanical switch sensor, in accordance with one embodiment.

As previously noted, the sensor at the socket may receive input from the securely connected plug using various means (e.g., electrical sensor (microswitch), proximity switch (magnetic, optical), mechanical switch (latch mechanism, actuation device), or other means). FIGS. 4A-4C illustrate different examples of an input device at a plug 42*a*, 42*b*, 42*c* operable to interface with a sensor 44, 46, 48 at socket 40*a*, 40*b*, 40*c*, respectively. The socket comprises a receptacle 43 for receiving a portion of the plug, which is coupled to cable 41. Interlock wires 39 send a signal to the control unit at the electronic controller upon identifying connection of the plug and socket, as described above.

Referring first to FIG. 4A, plug 42*a* comprises shorting switch contacts 45 for securely mating with the interlock wires 39 at contacts (sensor) 44. When the plug 42*a* is inserted into the receptable 43 of the socket 40*a*, the shorting contacts 45 complete the circuit at the interlock wires 39 and a signal is sent to the control unit.

FIG. 4B illustrates a proximity switch comprising a proximity sensor 46 at socket 40*b* and input element 47 in plug 42*b*. The sensor 46 may comprise, for example, a magnetic sensor, optical sensor, or other sensor operable to sense proximity of element 47 (e.g., magnet, light blocking device, or other element) and send a signal on interlock wires 39 to indicate a secure connection of the plug 42*b* and socket 40*b*.

FIG. 4C illustrates an electromechanical switch comprising a latch sensor (microswitch) 48 at socket 40*c* for a secure mating with latching mechanism 49 at plug 42*c*. The latch sensor 48 in the socket 40*c* verifies that the plug 42*c* is securely mated with the socket to provide external safety interlock control of the electronic circuit breaker/switch and signal a power OFF condition when the latching mechanism is disconnected before removing the plug from the socket. As described below with respect to FIGS. 5B and 5C, the connector may comprise a twist-lock plug to provide contact between the sensor 48 and latching mechanism 49.

Figure 5A:
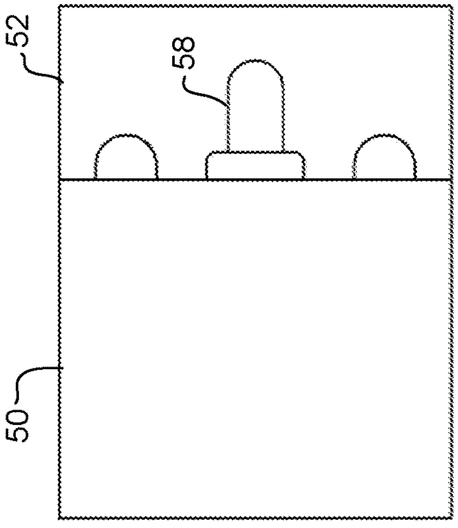
FIG. 5A is a side view of the electronic controlled switch or circuit breaker and integrated socket, in accordance with one embodiment.
Figure 5B:
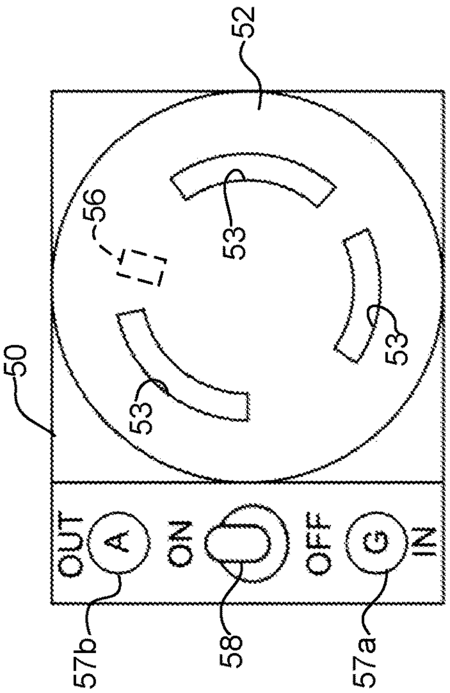
FIG. 5B is a front view of the electronic controlled switch or circuit breaker and integrated socket of FIG. 5A.
Figure 5C:
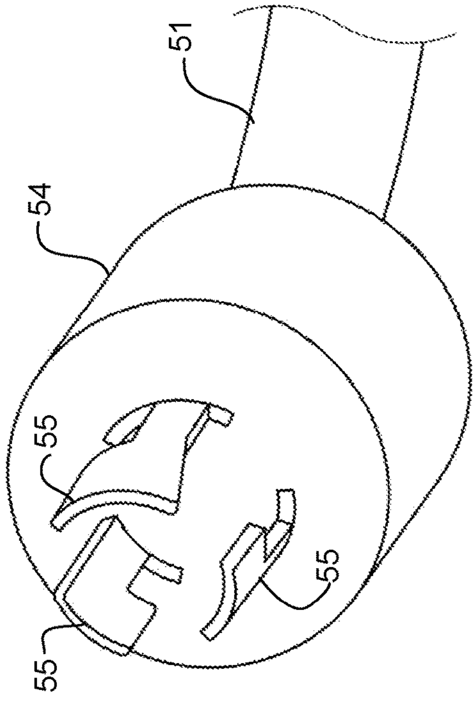
FIG. 5C is a perspective of a plug for mating with the socket of FIG. 5B.
Figure 5D:
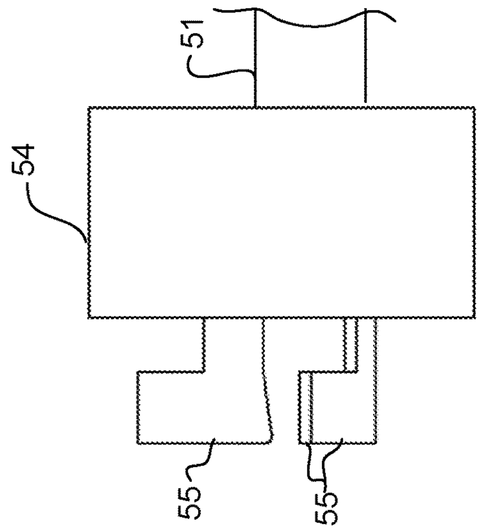
FIG. 5D is a side view of the plug shown in FIG. 5C.

FIG. 5A is a side view and FIG. 5B is a front view of an integrated electronic controller (switch, circuit breaker) 50 and electrical socket 52, in accordance with one embodiment. A mating plug 54 with cable 51 is shown in perspective in FIG. 5C and in a side view in FIG. 5D. The socket 52 comprises three openings (socket contacts) 53 for receiving three prongs (external pin contacts) 55. As shown in FIG. 5B, the socket includes an internal microswitch 56. After insertion of the contacts 55 into socket openings 53 the plug 54 may be rotated (twists and locks) relative to the socket 52 so that one of the contacts engages (provides input) to the microswitch 56. It may be noted that the switch 56 may be any other type of switch that allows the electronic controller to sense the twist and lock position of the plug (e.g., optical sensor or other type of proximity sensor).

As shown in the example of FIGS. 5A and 5B, the electronic controller 50 comprises a manual input switch (e.g., toggle switch) 58 that allows a user to manually turn the power ON or OFF. If the manual switch is in the ON position, power will not be enabled at the socket 52 until the microswitch 56 senses connection of the plug 54 to the socket 52. As previously described, one or more LED indicators 57*a*, 57*b* may be provided for identifying a power status (e.g., input power or output power at the electronic controller 50).

Figure 6:
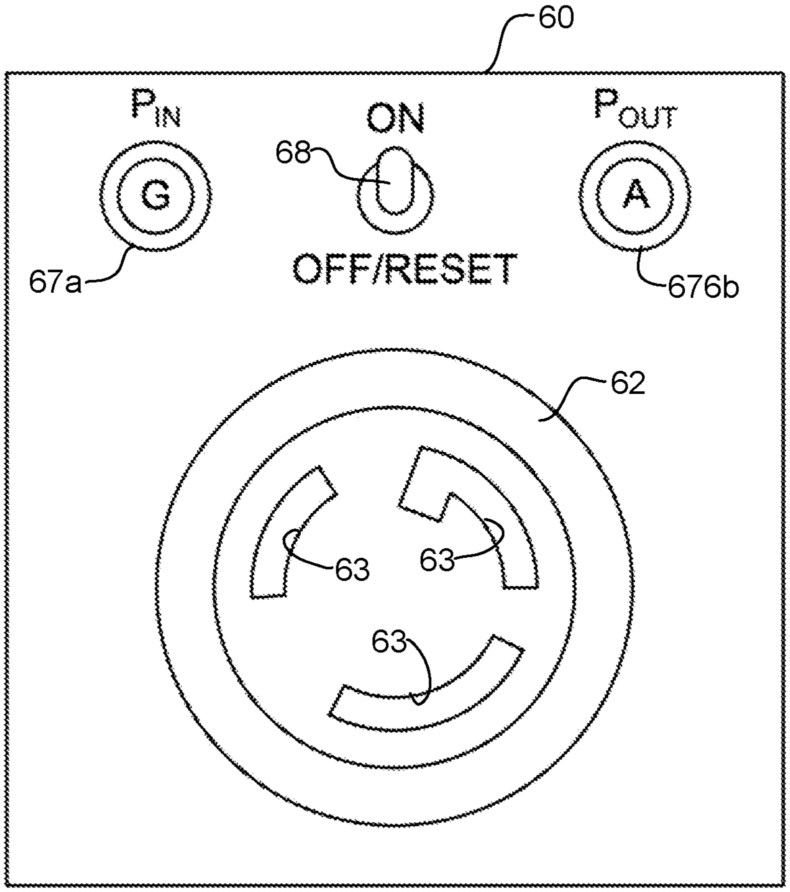
FIG. 6 is a front view of an electronic controlled switch or circuit breaker and integrated socket, in accordance with one embodiment.

FIG. 6 is a front view illustrating another example of a power socket 62 integrated with an electronic controller 60. The socket 62 includes openings 63 for receiving plug contacts. In this example, one of the opening 63 comprises a latching notch for securely holding the plug in place and providing sensor input. The electronic controller 60 comprises a manual input switch 68 and LED indicators for indicating status of power in (LED 67*a*) and power out (LED 67*b*). The socket 62 may comprise a microswitch, proximity sensor, or other type of sensor as previously described.

Figure 7:
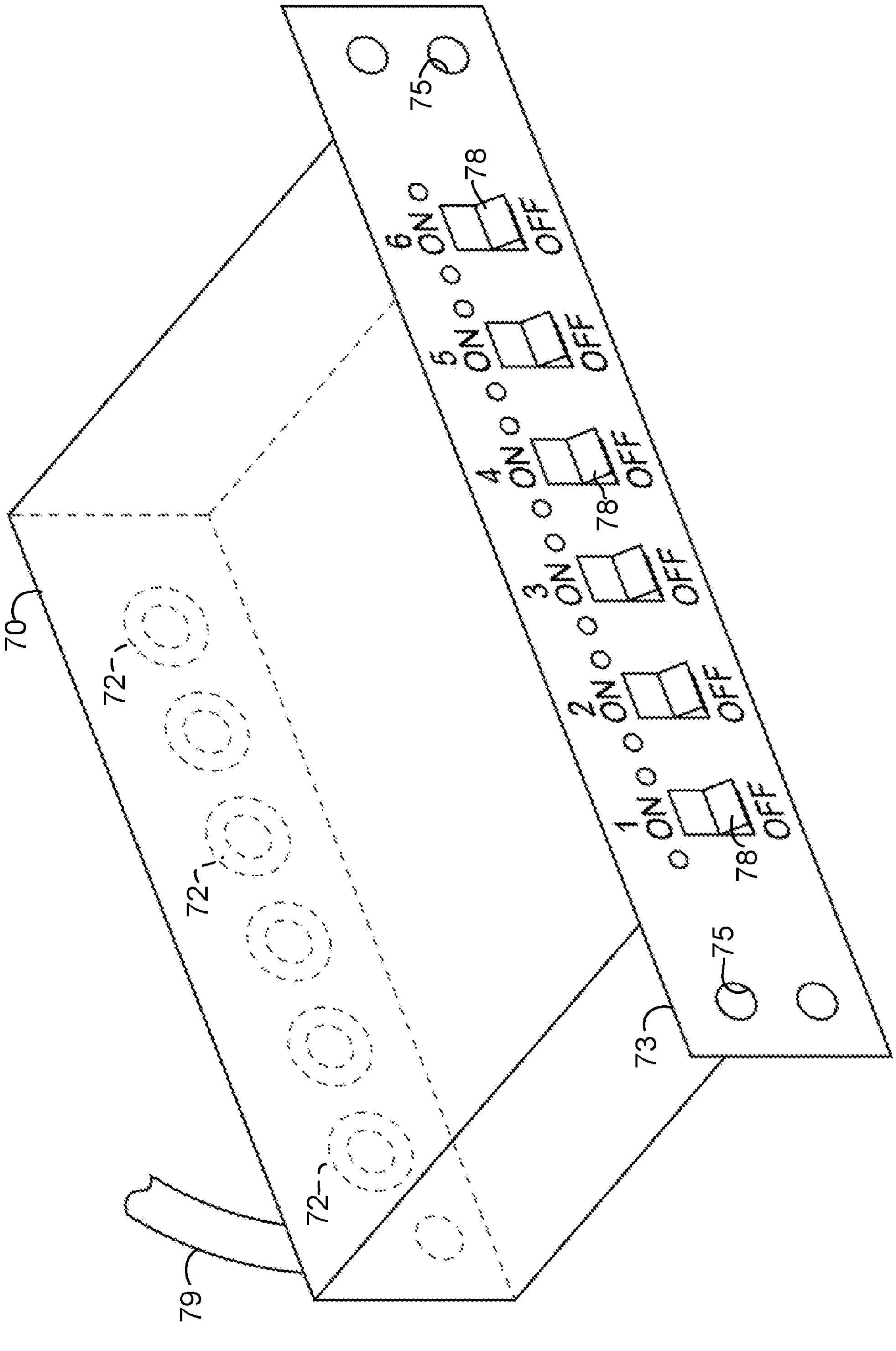
FIG. 7 is a perspective of an electronic controlled switch or circuit breaker with multiple sockets, in accordance with one embodiment.

FIG. 7 illustrates an example of a power distribution unit (PDU) 70, in accordance with one embodiment. The PDU 70 comprises an input cable 79 and a plurality of sockets 72. Each socket 72 is associated with an electronic controller (switch, circuit breaker) (not shown) comprising a manual input switch 78. In this example, the sockets are located along a rear edge of the PDU 70 and the manual input switches 78 are positioned along a front panel 73. The panel 73 may include openings 75 for receiving fasteners for attaching the PDU 70 to a rack or other structure. The cable 79 may also comprise one or more control wires for transmitting remote input control or receiving monitoring data, for example. The PDU 70 or individual electronic controller and sockets may be used in power feeds in power busways, power strips, pendent power drops, power cords, or other arrangements.

Figure 8:
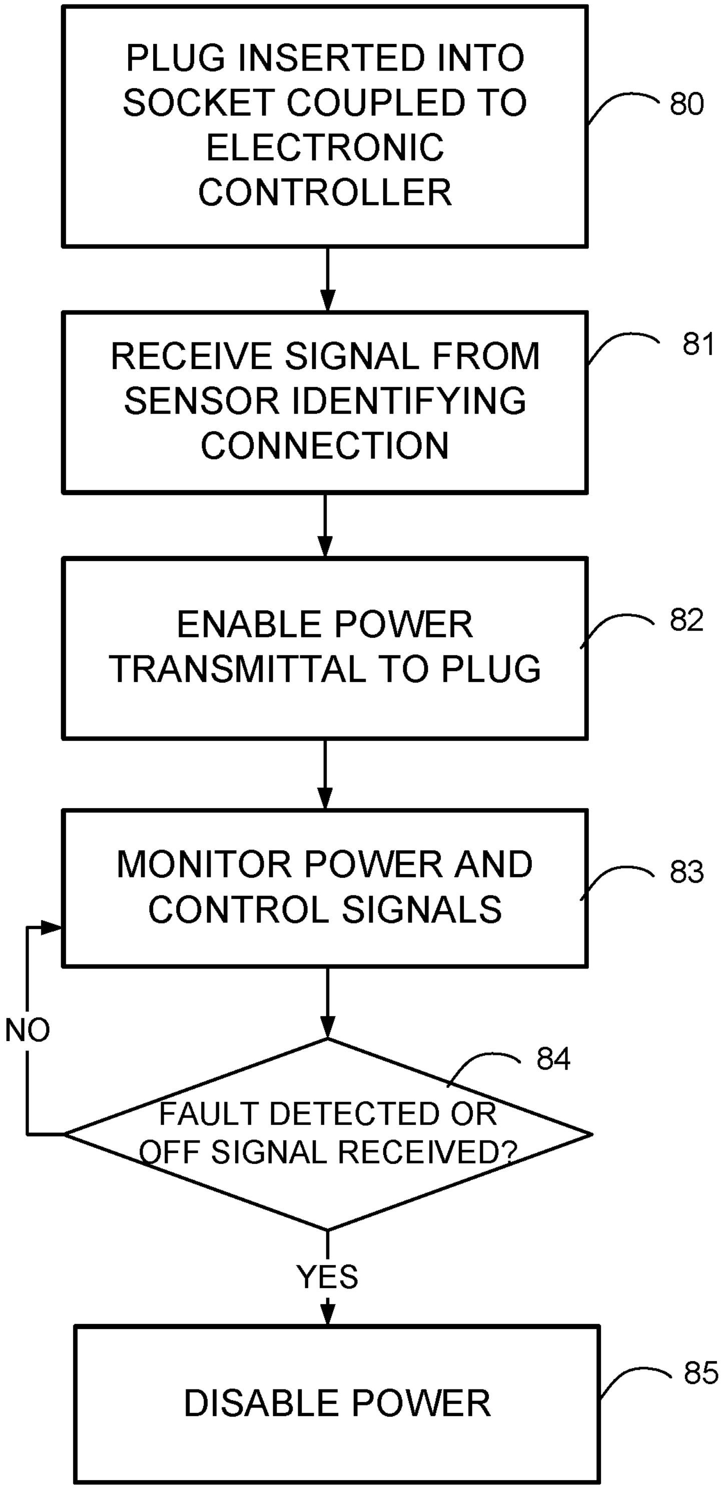
FIG. 8 is a flowchart illustrating an overview of a process for controlling power at the electronic controlled switch or circuit breaker with integrated socket, in accordance with one embodiment.

FIG. 8 is a flowchart illustrating a process for providing safe high voltage power, in accordance with one embodiment. A plug is inserted into a socket coupled to an electronic controller (circuit breaker, switch) at step 80 (e.g., socket 22, plug 24 in FIG. 2). The sensor 26 at the socket 22 transmits a signal to the electronic controller 27 upon identifying insertion and proper connection between the plug 24 and socket 22 (step 81) (FIGS. 2 and 8). An electronic signal is sent to the switch 18 at the electronic controller 20 to enable power transmittal to the socket 22 and connected plug 24 (step 82). Power (e.g., voltage, current) may be monitored at the electronic controller along with remote control signals (step 83). If a fault is detected (e.g., overcurrent, short circuit) or a power off signal is received, the electronic controller 27 disables power (steps 84 and 85). Power may be applied again after a specified period of time, if the plug and socket are still connected, to check if the fault has cleared.

It is to be understood that the process shown in FIG. 8 is only an example and steps may be modified, added, combined, or removed, without departing from the scope of the embodiments.

Figure 9:
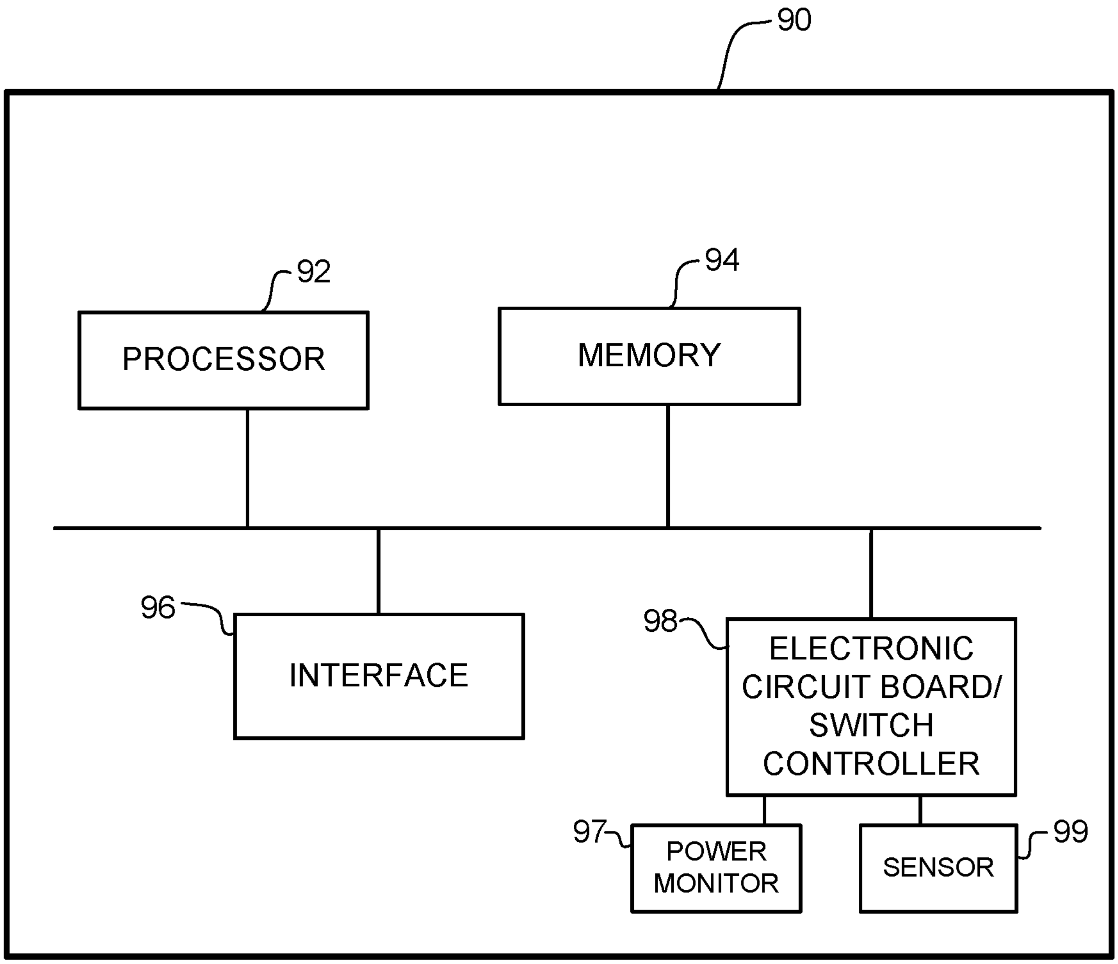
FIG. 9 is a block diagram depicting an example of a device in which the embodiments described herein may be implemented.

FIG. 9 illustrates an example of a device 90 that may implement one or more embodiments described herein. In one or more embodiments, the device 90 is a programmable machine that may be implemented in hardware, software, or any combination thereof. The device 90 includes one or more processor 92, memory 94, interface 96, and electronic circuit breaker/switch controller 98. In one or more embodiments, the electronic circuit breaker/switch controller 98 may comprise a power monitor 97 for use in monitoring input or output power (current, voltage) at the controller. Sensor 99 (e.g., electrical sensor/switch, proximity sensor, mechanical switch) identifies connection of the electrical plug to the electrical socket at the controller so that the controller can enable power transmittal from the socket to the plug, as described above.

Memory 94 may be a volatile memory or non-volatile storage, which stores various applications, operating systems, modules, and data for execution and use by the processor.

Logic may be encoded in one or more tangible media for execution by the processor 92. For example, the processor 92 may execute codes stored in a computer-readable medium such as memory 94. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. In one or more embodiments, the processor 92 may be operable to perform the steps shown in the flowchart of FIG. 8.

The interface 96 may comprise any number of interfaces for receiving data or transmitting data to other devices, or receiving or delivering power. The interface 96 may be used, for example, to receive a control signal at the controller 98 to shut off power.

It is to be understood that the device 90 shown in FIG. 9 and described above is only an example and that different configurations of devices may be used. For example, the device may further include any suitable combination of hardware, software, algorithms, processors, devices, components, or elements operable to facilitate the capabilities described herein.

Figure 10:
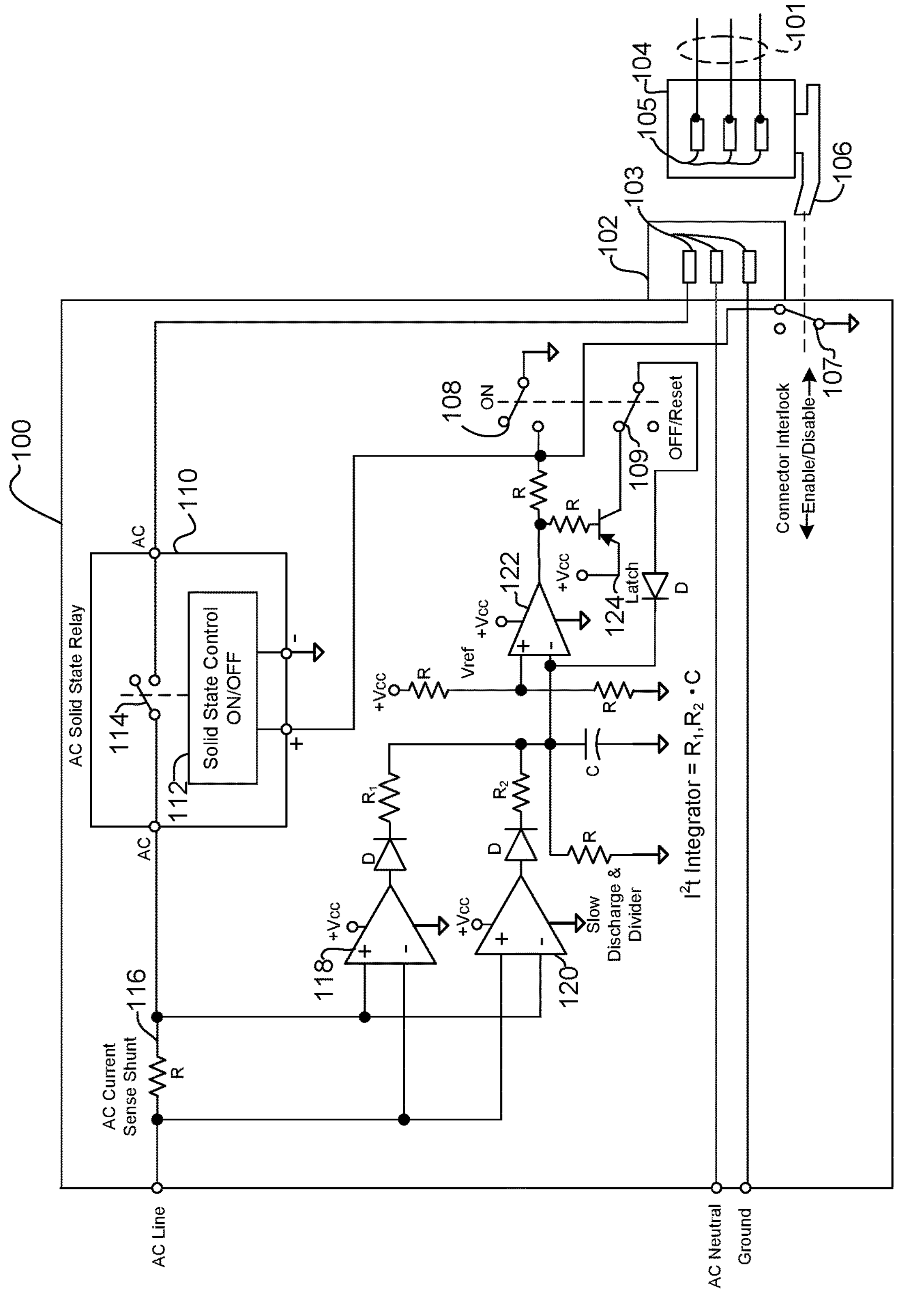
FIG. 10 is an electrical schematic of an AC electronic circuit breaker with integrated socket, in accordance with one embodiment.

FIG. 10 illustrates an electrical schematic of an AC single-phase Wye electronic circuit breaker 100 with integrated socket 102, in accordance with one embodiment. Input includes AC line, AC neutral, and ground. In this example, an SSR (Solid State Relay) switch 110 is used in combination with a connector microswitch 107. An AC socket 102 is integrated with the electronic circuit breaker 100 and includes socket contacts 103 for receiving pin contacts 105 of an AC plug 104 coupled to AC cable 101 (comprising line, neutral, and ground wires). The plug 104 includes a latch 106 for mating with the microswitch 107 at the electronic circuit breaker 100. The microswitch 107 provides input to a solid state controller 112 coupled to switch 114. When the switch 114 is closed power is provided, through AC current sense shunt 116 to the AC socket 102. The controller 112 also receives input from ON switch 108 and OFF/Reset switch 109. The OFF/Reset switch 109 is coupled to a latch 124. The circuit also includes comparator 122 and differential amplifiers 118, 120. As shown in the example of FIG. 10, the circuit is configured with a slow discharge and divider subcircuit and an $I^2t$ integrator (R1, R2, C).

It is to be understood that the circuit shown in FIG. 10 is only an example and the circuit may comprise any number of electrical components (resistors R, capacitors C, diodes D, switches, amplifiers) in any suitable arrangement, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:

an electrical socket for connection with an electrical twist-lock plug;

a sensor for identifying a secure connection between the electrical socket and the electrical twist-lock plug, wherein the sensor comprises a mechanical switch configured to engage with one plug contact of a plurality of plug contacts of the electrical twist-lock plug based on the electrical twist-lock plug being twisted; and an electronic controller electrically coupled to the electrical socket and comprising:

a power input for receiving power; and an indicator for identifying whether power is being delivered to the electrical socket, wherein the indicator includes at least two indicators indicating statuses of a power in and a power out, wherein the electronic controller is operable to transmit power to the electrical socket upon receiving a signal from the sensor identifying said secure connection between the electrical socket and the electrical twist-lock plug and shut off power to the electrical socket upon receiving an external input to the electronic controller.

2. The apparatus of claim 1, wherein the electrical socket and the electrical twist-lock plug are configured for at least 240 volts direct current.

3. The apparatus of claim 1, wherein receiving the external input comprises receiving the external input from a manual internal power control switch integrated into the electronic controller.

4. The apparatus of claim 1, wherein the external input comprises an electrical signal for external power control transmitted from a remote location.

5. The apparatus of claim 1, wherein the electronic controller is configured to transmit power monitoring information to a remote location.

6. The apparatus of claim 1, wherein the electronic controller comprises an electronic circuit breaker.

7. The apparatus of claim 1, wherein the electronic controller is configured to provide overcurrent and overvoltage protection.

8. The apparatus of claim 1, wherein the apparatus is configured to receive multi-phase pulse power.

9. The apparatus of claim 1, wherein the sensor further comprises a proximity sensor.

10. The apparatus of claim 1, wherein the sensor further comprises an electrical switch.

11. The apparatus of claim 1, wherein the at least two indicators include at least two light emitting diodes.

12. The apparatus of claim 1, wherein the electrical socket includes a plurality of openings for receiving the plurality of plug contacts of the electrical twist-lock plug, and wherein one of the plurality of openings includes a latching notch configured to secure the electrical twist-lock plug in the electrical socket and for providing sensor input.

13. An apparatus comprising:

an electronic circuit breaker comprising a power input for receiving power;

an integrated electrical socket for transmitting the power to an electrical twist-lock plug that is connected to the integrated electrical socket;

an indicator for identifying whether power is being delivered to the integrated electrical socket, wherein the indicator includes at least two indicators indicating statuses of a power in and a power out; and a sensor for identifying secure connection of the integrated electrical socket to the electrical twist-lock plug, wherein the sensor comprises a mechanical switch configured to engage with one plug contact of a plurality of plug contacts of the electrical twist-lock plug based on the electrical twist-lock plug being twisted;

wherein the power is transmitted to the electrical twist-lock plug upon the sensor identifying said secure connection between the integrated electrical socket and the electrical twist-lock plug.

14. The apparatus of claim 13, wherein the apparatus is configured for at least 240 volts direct current.

15. The apparatus of claim 13, wherein the electronic circuit breaker is operable to disconnect the power upon receiving local input.

16. The apparatus of claim 13, wherein the electronic circuit breaker is operable to disconnect power upon receiving a signal from a remote source.

17. The apparatus of claim 13, wherein the electrical twist-lock plug comprises an electrical interlock for communication with the sensor.

18. The apparatus of claim 13, wherein the electronic circuit breaker comprises an electrical monitor.

19. A method comprising:

receiving an electrical twist-lock plug at an electrical socket integrated with an electronic controller;

receiving a signal from a sensor identifying a secure connection of the electrical twist-lock plug to the electrical socket at the electronic controller, wherein the sensor comprises a mechanical switch configured to engage with one plug contact of a plurality of plug contacts a contact of the electrical twist-lock plug based on the electrical twist-lock plug being twisted;

enabling power transmittal from the electrical socket to the electrical twist-lock plug;

indicating that power is being delivered to the electrical socket includes at least two indications of statuses of a power in and a power out;

receiving a control signal at the electronic controller to shut off the power; disabling said power transmittal from the electrical socket to the electrical twist-lock plug; and indicating that power is not being delivered to the electrical socket.

20. The method of claim 19, wherein the electronic controller comprises an electronic circuit breaker.

21. The method of claim 19, wherein the control signal comprises a manual input at the electronic controller.

22. The method of claim 19, wherein the control signal comprises an analog signal received from a remote source.

23. The method of claim 19, wherein the control signal comprises a digital signal received from a remote source.

* * * * *